July 16, 1929.                C. W. JOHNSON                 1,720,791
                    METHOD OF MAKING THRUST BEARINGS
                         Filed Sept. 18, 1924
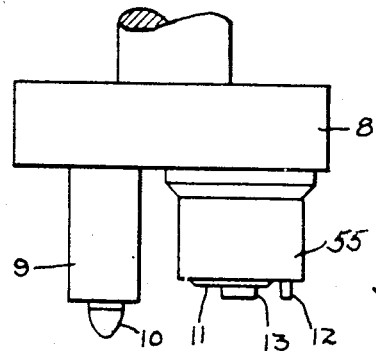
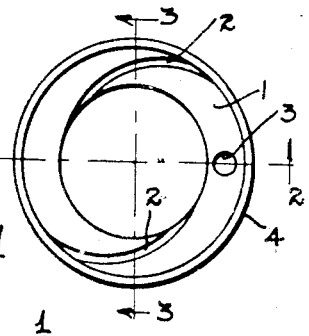
Fig.1
Fig.2
Fig.3
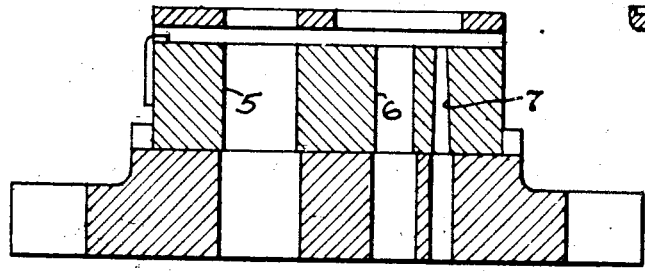
Fig.4
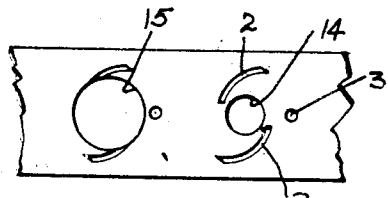
Fig.5
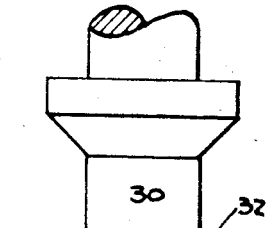
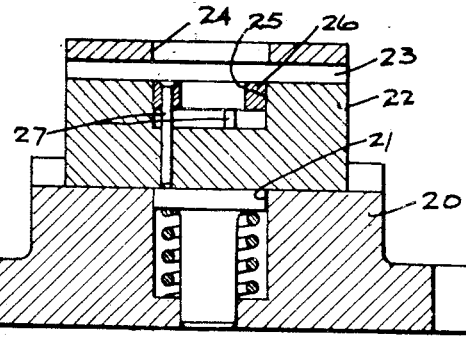
Fig.6
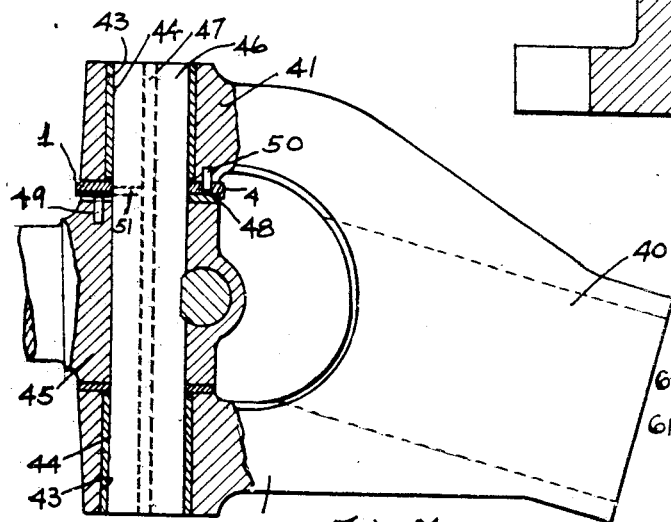
Fig.7
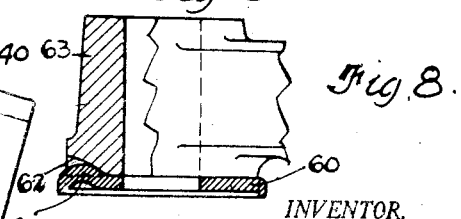
Fig.8
INVENTOR.
Carl W. Johnson
BY
Fay, Oberlin + Fay
ATTORNEYS.

Patented July 16, 1929.

1,720,791

UNITED STATES PATENT OFFICE.

CARL W. JOHNSON, OF SHAKER HEIGHTS, OHIO, ASSIGNOR TO THE CLEVELAND GRAPHITE BRONZE COMPANY, OF CLEVELAND, OHIO, A CORPORATION OF OHIO.

METHOD OF MAKING THRUST BEARINGS.

Application filed September 18, 1924. Serial No. 738,392.

The present invention, relating, as indicated, to a thrust bearing and a method of producing the same, is more particularly directed to the provision of a thrust bearing formed in a single piece of rolled sheet metal, and to a method of producing the same rapidly and economically, and at the same time producing lubricant-receiving openings and openings for fixing the bearing in place. To the accomplishment of the foregoing and related ends, said invention, then, consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

In said annexed drawings:—

Fig. 1 is a plan view of my improved bearing; Fig. 2 is a section on the line 2—2, in Fig. 1; Fig. 3 is a second section on the line 3—3, in Fig. 1; Fig. 4 is a side elevation partially in section of one form of dies which may be employed in carrying out the first step in producing my improved bearing; Fig. 5 is a plan view of the blank strip after the operation of the means shown in Fig. 4; Fig. 6 is a view similar to Fig. 4, but showing one form of mechanism for carrying out the second operation in the manufacture of my improved bearing; Fig. 7 is a central vertical section through one end of the front axle of the motor vehicle illustrating one use for my bearing; and Fig. 8 is a similar fragmentary section showing a modification of the bearing.

Referring now to Figs. 1, 2 and 3, the bearing is shown to consist of an annular disk or ring 1 which is provided with spiral lubricant-receiving grooves 2, an opening 3 and a flange 4 disposed at substantially right angles to the plane of the disk. The opening 3 is for the reception of a pin for maintaining the bearing in position, as will be more fully explained hereinafter.

In the manufacture of this bearing a strip of sheet metal which has been rolled, and by this rolling materially hardened and sized to a given dimension of thickness, is passed between dies, which are shown in Fig. 4, and which consist of a female die provided with openings 5, 6 and 7 and a plunger or male die 8 which is in two parts and consists of a cylindrical plunger 9 having a projecting conical portion 10 thereon, while a second portion of the die consists of a cylindrical member 55 having raised projections 11 which are adapted to form the lubricant grooves, a central cylindrical portion 13 of smaller diameter than the main cylinder 55 and a projection 12 disposed eccentrically with respect to the central cylindrical portion 13 for forming the fixing hole 3. The strip is first passed beneath the cylindrical die 13 over the openings 6 and 7 and as this plunger descends it stamps out a central opening 14, (see Fig. 5) two (or more if desired) lubricant grooves 2 and the fixing opening 3. The strip is then passed further into the die over the opening 5 in this portion of the mechanism, and upon the next depression of the plunger the conical member 10 centers the strip by passing it into the central opening 14 which is formed in the first operation, after which the plunger 9 stamps out a central portion of the disk, that is, it enlarges the original opening 14 and forms a larger opening 15 through the strip.

The condition of the strip after removal of the dies shown in Fig. 4 is as shown at the left of the blank shown in Fig. 5.

This strip is then passed between dies which are shown in Fig. 6 and which consist of a base member 20, in which is disposed an upwardly pressed but yieldable plate 21. Mounted upon this base 20 is a die member 22 provided with a slot 23 for the introduction of the blank, and with an aligned opening 24 and recess 25. Mounted in the recess 25 is a ring 26 which is normally held in position, as shown in Fig. 6, by means of rods 27 which pass through the die 22 and bear against the spring pressed plate 21.

The plunger is shown above the die already described and consists of a cylindrical portion 30 which is of the same diameter as the opening 24 and the recess 25 in the female die, and this is the diameter of the finished bearing. Extending below this portion 30 is a conical centering punch or member 31 and a concentrically disposed cylindrical shoulder 32. The strip shown in Fig. 5 is disposed in the die 22 with the opening 15 through the blank concentric with and above the recess 25 in the die 22. As the plunger descends the conical end 31 is passed into the opening 15 and the cylindrical portion 33 at the base of this conical portion passes through the opening 15 in the blank. Further depression of the plunger brings this shoulder 32 against the metal of the blank surrounding the opening 15 and presses this portion of the disk downward. This shoulder has a diameter less than the diameter of the recess 25 by an amount about one-half the thickness of the disk, and this action of the plunger therefore depresses the main portion of the disk below the surrounding portion and produces the flange 4, which is shown in Figs. 1, 2 and 3. Further movement of the plunger cuts off this formed and flanged disk from the remainder of the blank.

In Fig. 7 I have shown the front axle 40 of a motor vehicle, the axle having forked ends 41 and 42 provided with aligned openings 43 therethrough, in which are mounted cylindrical bearings 44. Interposed between the two arms 41 and 42 of the axle is the inner end of a wheel spindle 45, which is provided with an opening therethrough which is in alignment with the openings through the bearings 44 in the two arms of the axle, and in these three elements there is received a shaft or king pin 46 which is provided with a central lubricating opening 47. The weight of the car is of course borne by the axle and the weight of each axle is borne by the wheel, and in the first instance by the spindle 45, so that an extremely high pressure is exerted upon the upper surface of the spindle end 45. On this surface there is mounted a hardened metal washer 48 which is secured against rotation by means of a pin 49, and my improved thrust bearing is mounted on top of this washer and is fixed to the upper end 41 of the axle by means of a second pin 50, which is received in the opening 3 in the washer. The flange 4 on the bearing engages snugly over the outer edge of the lower washer 48. Lubricant is carried from the opening 47 in the king pin through a lateral hole 51 to the surface between the bearing 1 and plate 48, and is there retained in the lubricant grooves 2 in the upper bearing and is wiped over the surface of the lower washer or plate during oscillation of the spindle with respect to the axle. This oscillation is of course the result of turning the wheels of the vehicle and is fairly constant, so that lubrication is continually supplied to the major portion of the lower plate.

The present bearing possesses the merit of being extremely simple and economical, both to use and to produce, while the method of producing a bearing involving, first, the rolling of a sheet, and then the working of this sheet, very materially hardens the metal and increases its resistance to wear and its strength and toughness against shock. A further advantage of the present bearing is that the lubricant grooves are formed in the bearing by pressure instead of by machining and cutting, and results in relatively round edges adjoining the grooves which are maintained in this condition during subsequent operations of manufacture. The result is that there are no sharp edges or particles on the working face of the bearing which tend to cut or abrade the contacting surfaces as is so frequently the case with bearings having machined grooves. The economy of manufacturing bearings from sheet metal by the simple series of operations described above over the cost of casting and then machining bearings is of course too apparent to require detailed explanation.

In Fig. 8 I have shown a thrust bearing 60 of the same general construction as that previously described, except that it is provided with a depression 61 which fits into a corresponding recess 62 in the upper arm of the axle 63, the bearing being locked against rotation in this manner. The recess 62 may be formed in the stock at the same time as the opening 3 by appropriate changes in the dies of Fig. 4.

Other modes of applying the principle of my invention may be employed instead of the one explained, change being made as regards the means and the steps herein disclosed, provided those stated by any of the following claims or their equivalents be employed.

I therefore particularly point out and distinctly claim as my invention:—

1. In a method of making bearings of the character described, the steps which consist in rolling to a predetermined thickness and simultaneously hardening a strip of sheet metal, then pressing lubricant-receiving grooves into one surface of said strip then blanking a hole through said strip, said hole embracing a portion of each said grooves, and then blanking a disk from such strip containing said grooves and simultaneously forming an angular flange around the edge of such cut-out disk.

2. In a method of making bearings of the character described, the steps which consist in pressing lubricant-retaining grooves into a strip of rolled sheet metal, then blanking a circular disk containing such grooves from said strip and simultaneously forming an angular flange around the edge of such cut out disk.

3. In a method of making bearings of the character described, the steps which consist in pressing lubricant retaining grooves into a strip of rolled sheet metal, then blanking a hole through said strip, said hole embracing a portion of each said grooves, then blanking a circular disc containing such grooves from said strip and simultaneously forming an angular flange around the outer periphery of said cut-out disc.

Signed by me, this 15th day of Sept., 1924.

CARL W. JOHNSON.